United States Patent Office 3,564,946
Patented Feb. 23, 1971

3,564,946
CORE BORER
Alfred Käser, Rieden, Nussbaumen, Switzerland, assignor to Aktiengesellschaft Brown, Boveri & Cie, Baden, Switzerland, a joint-stock company
Filed June 3, 1969, Ser. No. 829,980
Claims priority, application Switzerland, June 5, 1968, 8,307/68
Int. Cl. B23b 51/04, 51/06
U.S. Cl. 77—68                                    6 Claims

ABSTRACT OF THE DISCLOSURE

A core drill structure includes a hollow drill shaft at the end of which an annular tool head is located. The end face of the tool head carries a plurality of circumferentially spaced cutting plates the edges of which serve to drill an annular hole leaving a central core which is accommodated within the hollow drill shaft as the hole deepens. To prevent damage to the drill head in the event of breakage of the cutting edge on one or more of the cutting plates, two sets of combined stop and brake means are provided for the head. One set is constituted by a plurality of circumferentially spaced brake shoes secured to the end face of the drill head where the drilling action takes place, and which project radially inward for a slight distance beyond the inner periphery of the annular drill head and are engageable with the periphery of the core only as the diameter of the latter increases upon breakage of one or more cutting edges. the other set is constituted by a plurality of circumferentially spaced strips set into grooves in the outer surface of the drill head and which run parallel with the drill axis. These strips project radially outward for a slight distance beyond the outer periphery of the annular drill head and are engageable with the periphery of the drill hole only as the diameter of the latter decreases upon breakage of one or more cutting edges. The two sets of combined stop and brake means serve to prevent contact as between either the inner or outer periphery of the annular drill head and the surface of the core or drill hole, respectively, and they also impose a frictional braking force on the rotating drill head which can be used as a signal for cutting off the driving power to the drill shaft.

---

The present invention relates to a core borer of drill structure of the type comprising at least one reversible plate having a cutting edge mounted in the drill head, and is directed to a further development of the drill structure as disclosed in my prior patent application Ser. No. 788,445, filed Jan. 2, 1969.

More particularly, it is the primary object of the present invention to prevent damage to the drill head in the event of breakage of a cutting edge on one of the cutting plates, and this objective is accomplished by the provision of a combined stop and arrangement on the drill head which come into operation should a cutting edge on one of the plates break off. The combined stop and brake can be arranged to brake the drill head by contact against the surface of the internal core being drilled out and also by contact against the surface of the bore hole itself in the workpiece.

Figure 1:
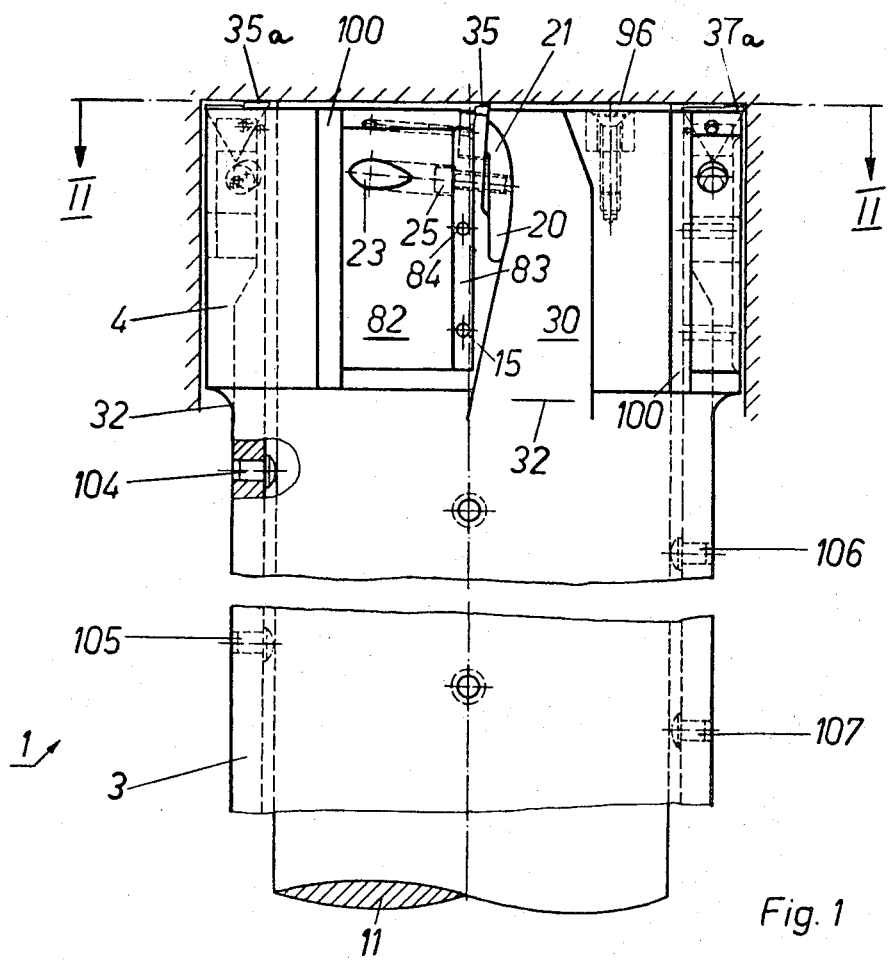
Figure 2:
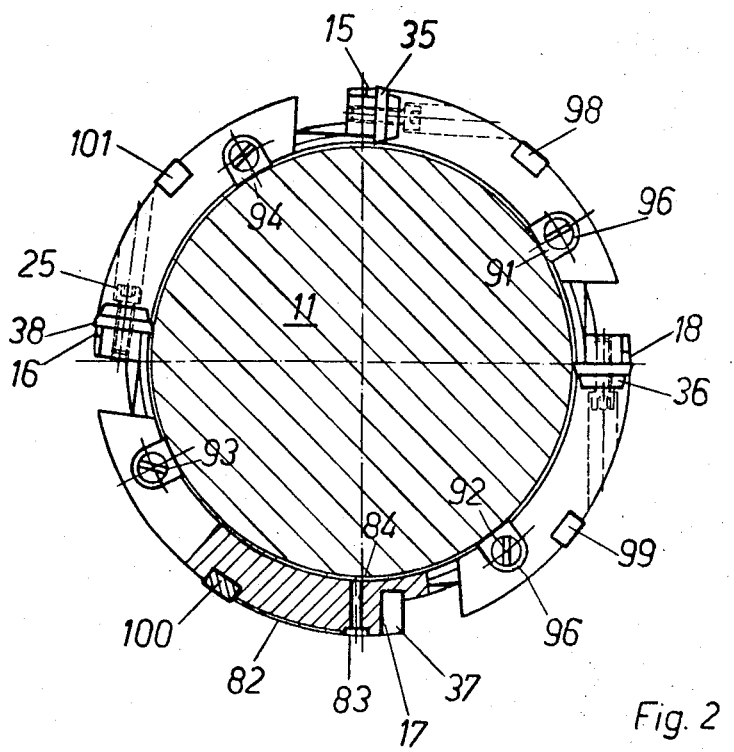

A representative embodiment of the invention will be described in detail and is illustrated in the accompanying drawings wherein:

FIG. 1 is a view in side elevation of the drill head with certain parts broken away; and FIG. 2 is a view in transverse section taken along line II—II of FIG. 1.

With reference now to the drawings, in which the same numerals are used as in the prior filed application to designate component parts, the overall core drill structure, which is designated by numeral 1 includes a hollow drill shaft 3 which terminates in an annular drill head 4 that is provided with four uniformly circumferentially spaced recesses 15, 16, 17 and 18 in which four reversible i.e. turnover cutting plates 35, 36, 37 and 38, preferably made of hard metal, are secured. Each of the four cutting plates is retained in its recess by means of a socket head cap screw 25 which can be introduced through an opening 23 in the drill head arranged tangentially and which screws into a clamp type holder 20 for the cutting plate. Insertion of the holders is accomplished from four oil drainage channels which serve to remove chips, and these channels are equispaced about the circumference of the drill head and extend from the outer face of the head along the head to its upper end where they terminate in openings. One such channel is shown at 30 in FIG. 1.

As explained in the above-mentioned earlier filed application, the reversible plates 35–38 which have a triangular configuration, have hard cutting edges 35a–38a along each of the three sides thereof and may be reversed or turned over after one edge has become dulled so as to present a fresh, sharp edge to the cutting face of the head. Each plate is secured within its recess in a plane substantially radial to the drill axis, and the in-use cutting edge of each plate is staggered in a radial direction with respect to the in-use cutting edge of an adjacent plate such that the cutting edge of each plate machines only a portion of the width of the annular hole which is being drilled. Also, the in-use cutting edges of the plates are disposed respectively in different planes normal to the drill axis such as to establish an axial staggering of the cutting edges of adjacent plates.

Should a breakage occur at the cutting edge 35a–38a of one of the four cutting plates 35 to 38, either the bore in the workpiece becomes smaller or the core 11 of the workpiece which is being drilled out and is located inside the annular drill head and hollow drill shaft, becomes larger, with the result that the drill head 4 would become damaged if permitted to continue its rotation unless some means for protection is provided. To avoid such damage, the present invention provides a combined stop and braking means for the drill head. Two types of stop and braking means are provided to achieve the objective of the invention.

One such braking means is constituted by a plurality of uniformly circumferentially spaced stop and brake shoes 91, 92, 93 and 94 which are secured to the front face of the drill head 4 by means of screws 96. As shown in FIG. 2, the braking surfaces of these shoes face radially inward and are adapted to make contact with the periphery of the core 11 but only in the event of a breakage on the cutting edge of a cutting plate, the contact as between brake shoe and periphery of the core 11 being established due to the fact that the diameter of the core 11 will enlarge as a result of the breakage.

The other combined stop and braking means is constituted by a plurality of uniformly circumferentially spaced stop and braking strips 98, 99, 100 and 101 located at the exterior of the head 4 and which are set into correspondingly positioned grooves running parallel with the drill axis. The strips 98–101 are secured within and project from the grooves in any convenient manner, and preferably by a shrinking technique. In the event of a breakage at the cutting edge of one of the cutting plates 35–38, with the result that the diameter of the bore hole in the workpiece becomes smaller, only then will the radially outward facing surfaces of the four strips 98–101 bear against the surface of the bore and hence exert a braking force on the drill head.

The drill shaft 3 is preferably provided with a plurality of uniformly circumferentially spaced guide stubs 104, 105, 106 and 107 in the form of set screws having inner rounded heads which screw into corresponding threaded holes through the wall of the hollow drill shaft 3. These screws, which are preferably made from hard metal or high speed tool steel, are adjusted longitudinally to establish an effective length in a direction radially inward from the inner surface of shaft 3 according to the core diameter and the desired clearance between the core 11 and the bolt heads.

Thus, in the event of breakage of a cutting edge, it is not possible for the drill head 4 to make contact with the bore hole in the workpiece because of the presence of the shoes 91–94 and the strips 98–101. As is obvious from the drawing, the shoes 91–94 which extend inwardly slightly beyond the inner periphery of the annular head 4 in exercising a stop function prevent any damaging contact as between the inner periphery of the annular drill head 4 and the surface of the core, and the strips 98–101 which extend outwardly slightly beyond the outer periphery of the head 4, in exercising a stop function prevent any damaging contact as between the outer periphery of the drill head 4 and the interior surface of the bore hole. Since the shoes 91–94 and strips 98–101 are preferably made of hard metal or high-speed tool steel and actually bear against a surface of the stationary workpiece they also perform a braking function on the drill head in that they effect an increase in the rotational resistance for the drive used to impart rotation to the drill shaft and its head. Due to this increase in the amount of friction as compared with the friction effective at the face of the drill head during normal conditions of machining, the power absorbed by the driving motor for shaft 3, usually electrical, becomes increasingly greater. By installing a thermal type of release for motor cut-off one can then effect an automatic cut-off of the power supplied to the driving motor whenever there is a breakage at the cutting edge of the plates 35–38. The thermal release is made responsive to the current consumed by the motor and is set to trip open a switch controlling the motor in the event the current exceeds its normal overload value. This measure is made to take place with such rapidity that the drill head is brought to a standstill before the surfaces of the braking elements 91–94 and 98–101 are worn down to the point where damaging surface contact would occur as between the inner and/or outer peripheral surfaces of the drill head and the core or bore hole, respectively.

The combined stop and brake shoes 91–94 have the additional function, together with the guide stubs 104–107, to so guide core 11, that after completion of the drilling operation the core 11 can be slidably separated from the drill structure without damage to the cutting edges of the plates 35–38.

The combined stop and brake strips 98–101 also serve to create oil pressure pockets 82 which by being fed through oil grooves 83 and interconnecting distributing channels 84 ensure a pressurized oil bearing of the drill head in the workpiece.

I claim:

1. In a core drill the combination comprising a hollow shaft, an annular drill head secured to the lower end of said drill shaft, means providing a plurality of circumferentially and equally spaced recesses in the body of said drill head extending to the bottom thereof, a reversible plate having hard cutting edges along different sides thereof and secured in each recess in a plane substantially radial to the drill axis, the in-use cutting edge of each said plate being staggered in a radial direction with respect to the in-use cutting edge of an adjacent plate such that the cutting edge of each said plate machines only a portion of the width of the annular hole which is drilled, and the in-use cutting edge of said plates being disposed respectively in different planes normal to the drill axis such as to establish an axial staggering of the cutting edges of adjacent plates, first combined stop and brake means secured to and projecting radially inward of the inner periphery of said annular drill head for engagement with the periphery of the core upon an increase in the diameter of the core as a result of breakage of a cutting edge on one of said plates, and second combined stop and brake means secured to and projecting radially outward of the outer periphery of said drill head for engagement with the periphery of the drill hole upon a decrease in diameter of the drill hole as a result of breakage of a cutting edge on one of said plates.

2. A core drill structure as defined in claim 1 wherein said first and second combined stop and brake means are made from hard metal.

3. A core drill structure as defined in claim 1 wherein said first first and second combined stop and brake means are made from high-speed tool steel.

4. A core drill structure as defined in claim 1 wherein said first combined stop and brake means are constituted by a plurality of circumferentially spaced shoes secured to the front face of said annular drill head at which the cutting edges of said plates are located.

5. A core drill structure as defined in claim 1 wherein said second combined stop and brake means are constituted by a plurality of circumferentially spaced strips seated in a plurality of correspondingly spaced grooves in the outer periphery of said annular drill head.

6. A core drill structure as defined in claim 5 wherein said grooves for seating said combined stop and braking strips extend longitudinally of the axis of said drill head and wherein the interspaces between adjacent strips serve the additional function of establishing oil pressure pockets, oil inlet channels being provided for feeding oil to said interspaces.

References Cited

UNITED STATES PATENTS

| 2,610,529 | 9/1952 | Atkinson | 77—69X |
| 2,951,683 | 9/1960 | Tilden | 77—69UX |
| 3,203,493 | 8/1965 | Bergstrom | 77—67UX |

FRANCIS S. HUSAR, Primary Examiner

U.S. Cl. X.R.

77—69; 175—403